US012384667B2

(12) United States Patent
Bohnacker

(10) Patent No.: US 12,384,667 B2
(45) Date of Patent: Aug. 12, 2025

(54) CRANE WITH ADJUSTABLE FLOATING BALLAST

(71) Applicant: Liebherr-Werk Ehingen GmbH, Ehingen/Donau (DE)

(72) Inventor: Roland Bohnacker, Blaubeuren (DE)

(73) Assignee: LIEBHERR-WERK EHINGEN GMBH, Ehingen/Donau (DE)

( * ) Notice: Subject to any disclaimer, the term of this patent is extended or adjusted under 35 U.S.C. 154(b) by 246 days.

(21) Appl. No.: 18/349,846

(22) Filed: Jul. 10, 2023

(65) Prior Publication Data

US 2024/0034599 A1 Feb. 1, 2024

(30) Foreign Application Priority Data

Jul. 27, 2022 (DE) ..................... 10 2022 118 812.4

(51) Int. Cl.
*B66C 23/76* (2006.01)

(52) U.S. Cl.
CPC .................................... *B66C 23/76* (2013.01)

(58) Field of Classification Search
CPC ...................................................... B66C 23/76
See application file for complete search history.

(56) References Cited

U.S. PATENT DOCUMENTS 5,586,667 A * 12/1996 Landry .................. B66C 23/76 212/196
7,546,928 B2 * 6/2009 Pech ...................... B66C 23/76 212/196
10,961,088 B2 * 3/2021 Norz ...................... B66C 23/76
11,319,195 B2 * 5/2022 Norz ...................... B66C 23/76
2008/0099421 A1 * 5/2008 Pech ...................... B66C 23/76 212/196
2013/0292352 A1 11/2013 Zhang et al.
2019/0233261 A1 * 8/2019 Norz ...................... B66C 23/76
2020/0262687 A1 * 8/2020 Norz ..................... B66C 23/365

FOREIGN PATENT DOCUMENTS

| | | | |
|---|---|---|---|
| DE | 102018102025 | A1 | 8/2019 |
| EP | 2597066 | A1 | 5/2013 |
| JP | S429720 | Y1 | 5/1967 |
| JP | 2014502946 | A | 2/2014 |
| JP | 2020132434 | A | 8/2020 |

OTHER PUBLICATIONS

Japanese Patent Office, Office Action Issued in Application No. 2023-118130, Sep. 10, 2024, 11 pages.

* cited by examiner

*Primary Examiner* — Anna M Momper
*Assistant Examiner* — Juan J Campos, Jr.
(74) *Attorney, Agent, or Firm* — McCoy Russell LLP

(57) ABSTRACT

The disclosure relates to a crane, in particular a lattice boom mobile crane, which comprises an upper carriage rotatable about a vertical axis of rotation and a floating ballast connected to the upper carriage via a floating ballast guide. The floating ballast guide comprises a drive for changing the distance of the floating ballast from the axis of rotation of the upper carriage. According to the disclosure, the floating ballast guide is connected to the upper carriage via at least one force transmission member. The force transmission member is configured to partially unload the floating ballast guide by an unloading force counteracting the weight force of the floating ballast, and to thereby introduce a corresponding counterforce into the upper carriage.

14 Claims, 2 Drawing Sheets

CRANE WITH ADJUSTABLE FLOATING BALLAST

CROSS REFERENCE TO RELATED APPLICATION

The present application claims priority to German Patent Application No. 10 2022 118 812.4 filed on Jul. 27, 2022. The entire contents of the above-listed application is hereby incorporated by reference for all purposes.

TECHNICAL FIELD

The present disclosure relates to a crane, in particular a lattice boom mobile crane.

BACKGROUND

In addition to a mobile undercarriage, an upper carriage rotatably mounted on the undercarriage and a lattice boom pivotally mounted on the upper carriage, large lattice boom cranes often have an additional derrick boom that is also pivotally mounted on the upper carriage. The derrick boom is usually connected to the main boom via a length-adjustable guy in the form of a luffing adjustment and to an additional guy block via a further guying system. The guy block, which is articulated to the upper carriage, is in turn connected to the upper carriage via a length-adjustable luffing adjustment. This provides a larger guy angle for the main boom.

To counteract the load torque caused by a load lifted via the main boom, there is typically a counterweight device, also known as an upper carriage ballast, at the rear of the upper carriage with several stackable counterweight plates. For assembly and disassembly of the main boom and for lifting particularly heavy loads, a floating ballast may be provided in addition to the upper carriage ballast, which is connected to the tip of the derrick boom via a further guy, typically in the form of steel rods, and generates an additional counter-torque that counteracts the load torque. The floating ballast can be held suspended above the ground or can be seated on a movable ballast carriage so that the upper carriage can be rotated even when a floating ballast is used. The floating ballast typically comprises a support plate with a plurality of counterweight plates stacked thereon. A variable length cylinder is provided in the guy.

In order to be able to adjust the distance of the floating ballast to the rear of the upper carriage or to the axis of rotation of the upper carriage variably and in particular continuously and thus to adapt the counter-torque generated to the respective lifting task, it is known, for example, from DE 10 2018 102 025 A1 that the floating ballast is coupled to the rear of the upper carriage via a pivoting and folding floating ballast guide. This floating ballast guide comprises two articulated lattice sections and, as a drive, one or more hydraulic cylinders for folding the lattice sections in and out and thus for reducing or increasing the floating ballast radius.

In floating ballast operation with adjustable floating ballast guide, a relatively large upper carriage ballast is necessary for ensuring the stability of the crane, especially with regard to tilting of the entire crane perpendicular to the luffing plane (i.e. the plane in which the load is luffed). Such a load can be caused, for example, by wind from the side. Due to the usually very long jib systems of such cranes, large forces and torques can occur here.

The floating ballast is connected to the upper carriage via the floating ballast guide and the derrick boom. However, both connections are relatively "soft", especially when the floating ballast is set to a large radius. Thus, the hover ballast perpendicular to the luffing plane of the boom system can only provide a small amount of stability against the crane tipping. This, on the other hand, is made possible by the upper carriage ballast. Each stack of the upper carriage ballast has its own center of gravity. Although the entire upper carriage ballast has a center of gravity, which is also typically located in the luffing plane of the boom system, it always has a relevant distance to the lateral tipping edges of the crane defined by the undercarriage or the support. Since the upper carriage usually rigidly supports the upper carriage ballast, this can increase stability against lateral tipping.

In today's crane operations, the $CO_2$ balance sheet is a relevant aspect. The transport of heavy counterweight elements is a particularly disadvantageous factor. Heavy counterweight elements quickly overload transport vehicles, which means that additional transport vehicles have to be used, thus worsening the $CO_2$ balance.

To reduce the number and mass of the total counterweight plates used, their distance from the axis of rotation of the upper carriage or rotating assembly (i.e. the lever arm) would have to be increased accordingly. However, the mass of the floating ballast is usually already optimally utilized. It would still be conceivable to use the upper carriage ballast, which is relevant for stability, with a larger radius. However, the lengthening of the upper carriage that would then be necessary could have a negative effect on the adjustability of the suspension ballast. Shifting the upper carriage ballast to the floating ballast (which is at a greater distance from the axis of rotation of the upper carriage than the upper carriage ballast), on the other hand, is problematic with regard to the stability against lateral tipping described above, as this would then no longer be ensured.

SUMMARY

Against this background, the object underlying the present disclosure is that of improving the $CO_2$ balance of the use of such cranes without having to make sacrifices in terms of stability.

According to the disclosure, this object is achieved by a crane, in particular a lattice boom mobile crane, that is proposed which comprises an upper carriage rotatable about a vertical axis of rotation and a floating ballast connected to the upper carriage via a floating ballast guide. The floating ballast guide comprises a drive for changing the floating ballast radius, i.e. the distance of the floating ballast from the center of the rotating assembly, or axis of rotation of the upper carriage, respectively. The crane may be a crawler crane.

According to the disclosure, the floating ballast guide is connected to the upper carriage via at least one force transmission member. The force transmission member is configured to partially unload or relieve the floating ballast guide by means of an unloading force counteracting the weight force of the floating ballast, and to thereby introduce a corresponding counterforce into the upper carriage.

The counterforce introduced into the upper carriage has a component that acts in the direction of the weight force of the floating ballast. Depending on the magnitude of this force and the location of the force application, the upper carriage ballast, which is fixed to the upper carriage, can thus be completely or partially replaced.

This allows counterweight plates, which would otherwise form the upper carriage ballast, to be laid or stacked wholly or partially on the floating ballast without compromising the stability of the crane. The counterforce introduced into the upper carriage via the force transmission member can act as a lateral stabilizer to prevent the crane from tipping sideways. The relocation of counterweight plates from the upper carriage to the floating ballast increases their lever arm or distance from the axis of rotation of the upper carriage, so that fewer counterweight plates must be used to generate the same counter torque counteracting the load torque. In addition, sufficient installation space is available on the floating ballast to stack up any number of counterweight plates. The counterweight plates not required as a result do not have to be transported to the construction site, thus saving $CO_2$.

This counterforce or its downward force component can be small in magnitude compared to the weight force of the entire floating ballast and the floating ballast guide. Thus, all components involved or unloaded remain similarly high and loaded in the same direction by the weight force of the floating ballast when the floating ballast radius is large. Therefore, the floating ballast guide does not change its direction of rotation about its horizontal lulling axis on the upper carriage (i.e., the unloading force generated by the force transmission member is not sufficient to overcome the weight force of the floating ballast and floating ballast guide and to push the floating ballast guide upwards).

By means of the force transmission member provided in accordance with the disclosure, the upper carriage ballast can be selected to be considerably smaller or, at best, eliminated altogether and replaced with a constant or variable counterforce.

When in the following reference is made to the counterforce replacing or supplementing the upper carriage ballast, strictly speaking this refers to the downward component of the counterforce acting in the direction of the weight force of the floating ballast. Since the direction of action of the counterforce depends on the arrangement and design of the force transmission member and, if applicable, on the position of the suspension ballast guide and is not restricted to a specific angle, and for reasons of linguistic simplicity, in the following we will usually refer only to the counterforce.

In one possible embodiment, it is provided that the force transmission member is not part of the drive of the floating ballast guide. For example, the drive may include one or more hydraulic cylinders that couple the floating ballast guide to the upper carriage. In this case, these hydraulic cylinders may also introduce some counterforce into the upper carriage. In the case of these hydraulic cylinders or, more generally, in the case of the drive of the floating ballast guide, however, it is expressly not a question of the force transmission member according to the disclosure. This is provided in addition and serves for the targeted introduction of a constant or variable counterforce into the upper carriage and not for adjusting the floating ballast or the floating ballast guide.

In another possible embodiment, it is provided that the force transmission member is connected to a support device which is attached to the rear of the upper carriage and preferably protrudes or projects rearwardly from the upper carriage. The support device may constitute or comprise a support frame attached to the rear of the upper carriage. This allows the distance of the connection point of the force transmission member to the axis of rotation of the upper carriage to be extended to the rear and also its height above the ground to be reduced, so that sufficient installation space is available for the force transmission member between the support device and the floating ballast guide. Due to the cantilevered support device, the counterforce introduced into the upper carriage also acts on the upper carriage with a larger lever arm and thus more favorably than when an upper carriage ballast is used.

The fact that the support device is attached to the rear of the upper carriage also includes the case where the attachment points of the support device are arranged entirely or partially on the side of the upper carriage. Optionally, the support device can be connected to the luffing axis about which the floating ballast guide is mounted on the upper carriage so that it can pivot.

In another possible embodiment, at least two force transmission members are provided, which are arranged laterally and in particular mirror-symmetrically to a luffing plane extending through the axis of rotation of the upper carriage. The corresponding counterforces are thus introduced laterally into the upper carriage at the rear so that they can develop an optimum stabilizing effect against lateral tilting of the crane. The force transmission member can either be coupled or synchronized with one another or operate or act independently of one another.

In another possible embodiment, it is provided that the floating ballast guide comprises two lattice parts that are hingedly connected to each other via a swivel joint, wherein a first lattice part is pivotally connected to the rear of the upper carriage about a horizontal luffing axis. Preferably, the actuator comprises one or more hydraulic cylinders pivotally connected to one of the lattice parts. A possible embodiment of the floating ballast guide is disclosed in DE 10 2018 102 025 A1, to the contents of which reference is expressly made. The floating ballast guide can have more than two lattice parts or more than one swivel joint, e.g. in order to be able to further reduce the minimum possible distance of the floating ballast from the center of the rotating assembly.

In another possible embodiment, it is provided that the force transmission member is pivotally coupled to one of the previously described lattice parts of the floating ballast guide, preferably to the first lattice part, which is hinged to the upper carriage. The drive, on the other hand, may comprise one or more hydraulic cylinders coupling a second lattice part to the upper carriage.

In a further possible embodiment, it is provided that the unloading force that can be applied by the force transmission member, i.e. in particular the vertical force component of the unloading force—cf. the introductory remarks on the counterforce, is smaller in magnitude than the weight force of the floating ballast. As a result, the floating ballast is only unloaded or relieved and not lifted against the weight force. The floating ballast thus continues to act against the load torque.

In a further possible embodiment, it is provided that the magnitude of the unloading force that can be applied by means of the force transmission member is constant. This naturally also applies to the corresponding opposing force. This means in particular that the unloading force or the counterforce cannot be actively changed for a certain position of the floating ballast guide. On the other hand, it may be true that the applied unloading force or counterforce changes with the position of the floating ballast guide, for example in the case of a passive force transmission member, since this changes the distance between the floating ballast guide and the supporting device.

Alternatively, the magnitude of the unloading force or counterforce that can be applied by means of the force transmission member can be varied. In particular, this can mean that the unloading force or counterforce can be changed in a targeted manner when the floating ballast guide is in a constant position. Preferably, the magnitude of the unloading force or counterforce can be controlled, for example by a crane control and/or load torque limitation. This allows the counterforce acting on the upper carriage to be adjusted variably as required, for example for targeted manipulation of lateral stability or in response to a specific lifting task. In the case of a controllable force, the force transmission member can also be controlled in such a way that a defined, constant force or minimum force is established regardless of the position of the floating ballast guide.

In another possible embodiment, it is provided that the force transmission member is permanently connected to the floating ballast guide and the upper carriage. In the case of a passive force transmission member, forces can thus act permanently, while in the case of an actively controllable or adjustable force transmission member, the forces generated can be specifically activated/deactivated or adjusted.

In another possible embodiment, it is provided that the force transmission member comprises a spring device.

In a further possible embodiment, it is provided that the force transmission member can be actuated hydraulically to actively generate the unloading force or counterforce and, in particular, comprises a hydraulic cylinder. The latter includes the case where the force transmission member is a hydraulic cylinder. The force transmission member can preferably be controlled or regulated by means of a crane control system in such a way that a predetermined unloading force or counterforce is established. The unloading force or counterforce can, for example, be set automatically by a crane control system and/or load torque limiter and/or manually by an operator of the crane. Preferably, at least two force transmission members in the form of hydraulic cylinders are provided. Advantageously, these are not hydraulically connected to each other. Preferably, the cylinders are force-controlled. Thus, each hydraulic cylinder independently introduces its counterforce into the upper carriage.

Furthermore, a combination of passive and active force transmission member is conceivable, for example a combination of spring device and hydraulic cylinder.

In a further possible embodiment, it is provided that the value of the unloading force or counterforce generated by the force transmission member is transmitted to a load torque limitation of the crane and is preferably variable, in particular controllable, by the load torque limitation. The load torque limitation can be part of the crane control or can be performed by it.

Alternatively or additionally, an assistance system can be provided which controls or regulates the force transmission member in such a way that the floating ballast is at a fixed distance from the ground. Preferably, the floating ballast must always be close to the ground so that it can be lowered quickly and the boom system of the crane can be unloaded before tipping backwards.

Such assistance systems could be used, for example, for the erection of wind turbines. In order to achieve the required load, so much floating ballast could be applied that the boom system of the crane is at risk of tipping backwards after the load has been set down. In this case, the crane will preferentially set down its floating ballast and an auxiliary crane will remove counterweight plates from the set-down floating ballast. The crane then picks up its floating ballast again and can move. The boom system and the floating ballast are then back in balance. In the inventive solution, the optionally provided assistance system could actively control the force transmission member and take a force component out of the boom system (unloading force) and simultaneously introduce it as a force component into the upper carriage (counterforce). This allows the boom system to be brought back into equilibrium without having to remove or stack counterweight elements from the floating ballast.

In a further possible embodiment, it is provided that at least two force transmission members can be controlled or regulated independently of one another. Preferably, at least two force transmission members are provided in the form of hydraulic cylinders. Advantageously, these are not hydraulically connected to one another. Preferably, the cylinders are force-controlled. In this way, each hydraulic cylinder independently introduces its counterforce into the upper carriage.

In another possible embodiment, it is provided that the crane further comprises a derrick boom articulated to the upper carriage, which is connected to the floating ballast via a first guy and to the upper carriage via a second guy and, in particular, via a guy block. The derrick boom and/or the main boom can be secured against tilting backwards by hydraulic support cylinders whose force acting on the respective boom is preferably readjusted with the movement of the booms.

In a further possible embodiment, it is provided that the upper carriage comprises, in addition to the floating ballast, an immovable upper carriage ballast with stackable counterweight elements, the counterweight elements preferably being optionally stackable on the floating ballast. Alternatively, it can be provided that the upper carriage does not comprise an upper carriage ballast, but that the latter is completely replaced by the counterforce that can be applied via the force transmission member(s).

BRIEF DESCRIPTION OF THE DRAWINGS

Further features, details and advantages of the disclosure will be apparent from the exemplary embodiments explained below with reference to the figures. The figures show in.

DETAILED DESCRIPTION

Figure 1:
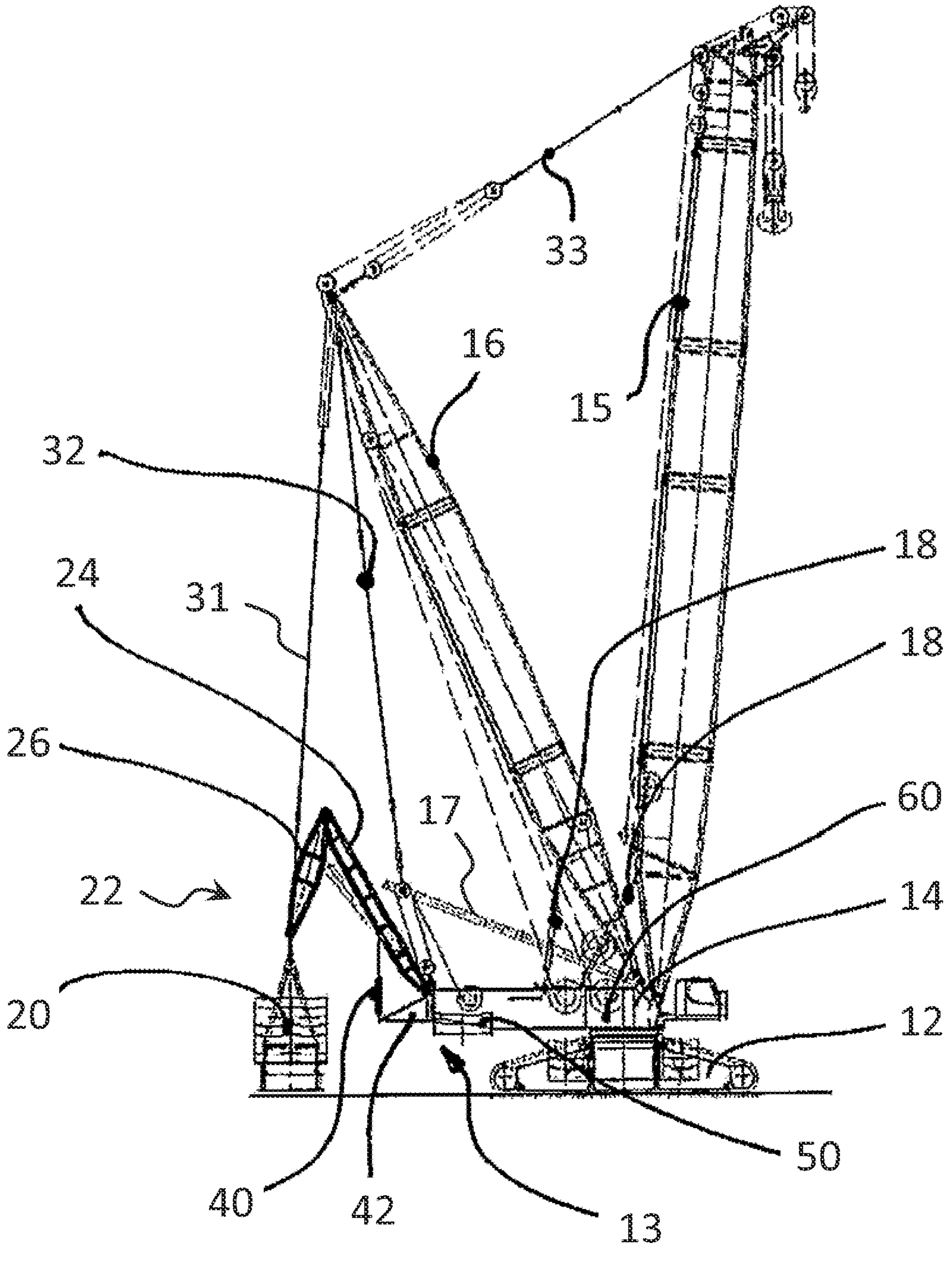
FIG. 1: a first embodiment of the crane according to the disclosure in a side view.

FIG. 1 shows a side view of the crane 10 according to a first embodiment. The embodiment shown here is a lattice boom mobile crane 10, which comprises a mobile undercarriage 12 with crawler chassis and an upper carriage 14 mounted on the undercarriage 12 so as to rotate about a vertical axis. A lattice boom for lifting a load, acting as the main boom 15, is mounted on the upper carriage 14 so as to be pivotable or luffable about a horizontal axis. Behind the main boom 15, a derrick boom 16 is mounted on the upper carriage 14 so as to pivot about a horizontal axis.

The derrick boom 16 is connected to the main boom 15 via a length-adjustable guy 33. The tip of the derrick boom 16 is connected to a floating ballast 20 via a first guy 31, which counteracts a load torque generated by a lifted load with a corresponding counter torque. The mass of the floating ballast 20 thus acts on the tip of the derrick 16 via the first guy 31. Via a second guy 32, the derrick boom 16 is connected to a guy block 17 mounted on the upper carriage 14 so that it can pivot about a horizontal axis. The guy block 17 is in turn connected to the upper carriage 14 via a length-adjustable lulling strand. The main boom 15 is luffed up or down by means of the length-adjustable guy 33.

Both the main boom 15 and the derrick boom 16 are held against "falling behind" by hydraulic guyed supports or support cylinders 18 in the embodiment example shown here. However, these guyed supports 18, which are moved along with the pivoting movements of the respective booms 15, 16, are limited in terms of force and, in particular, are not configured to hold the large mass of the floating ballast 20 suspended above the derrick boom 16 with a large floating ballast radius. The function of the guy supports 18 is to act as a counterforce or stop to secure the derrick booms 15, 16 to the rear.

In the embodiment example of FIG. 1, the crane 10 comprises an upper carriage ballast 50, which comprises two stacks of counterweight elements immovably mounted laterally at the rear 13 of the upper carriage 14. However, due to the function of the force transmission member 40 explained below, the height of these ballast stacks is considerably reduced compared to known cranes.

In order to be able to adjust the distance of the floating ballast 20 or the floating ballast radius variably and continuously during operation, the floating ballast 20 is coupled to the rear 13 of the upper carriage 14 via an adjustable floating ballast guide 22. In the embodiment example shown here, the floating ballast guide 22 comprises two lattice parts 24, 26 pivotably connected to one another via a horizontal pivot joint 23, a first lattice part 24 being mounted on the upper carriage rear 13 so as to be pivotable about a horizontal luffing axis 21 and a second lattice part 26 being connected to the floating ballast 20 in an articulated manner (cf. FIG. 2). A drive 28 in the form of one or more hydraulic cylinders is used to fold and unfold the two lattice parts 24, 26 of the floating ballast guide 22 and thereby change the floating ballast radius. The hydraulic cylinder or cylinders 28 are pivotally attached to the upper carriage rear 13 or to the first lattice part 24 and the second lattice part 26. When the drive (hydraulic cylinder 28) is fully extended or the floating ballast guide 22 is fully folded out, the distance of the floating ballast 20 to the axis of rotation of the upper carriage and thus also the counter-torque generated by the floating ballast 20 is at a maximum.

In variable hover ballast operation with the existing hinged hover ballast guide 22, a relatively high upper carriage ballast 50 would be necessary in a known crane to ensure stability in all directions, i.e. 360°. These 360° mentioned here have primarily little to do with turning the upper carriage 14, but rather involve tilting the entire crane 10 transversely to the luffing plane. The floating ballast 20 is connected to the upper carriage 14 via the floating ballast guide 22 and the derrick boom 16. Both connections are "soft", especially when the floating ballast 20 is set to a large radius. Thus, the floating ballast 20 perpendicular to the luffing plane of the boom system can only provide a small amount of stability against tipping of the crane 10. In conventional cranes, on the other hand, this is made possible by the upper carriage ballast 50, which is rigidly attached to the upper carriage 14.

For the sake of explanation, some general remarks on the stability of the crane 10 are made at this point. The undercarriage 12 has tilt edges in the area of the rollers on which the crawler tracks run. These tipping edges run both along the crawler tracks and between the two crawler tracks, forming a rectangle with four tipping edges. To prevent the crane 10 from tipping, the overall center of gravity of the crane 10 must always be within these tipping edges. For this purpose, a crane control 60 usually observes the load torque that wants to tilt the crane 10 forward, i.e. in the direction of the load on the main boom 15. This load torque is counteracted by the counter torque or ballast torque, which results from the masses of the upper carriage ballast 50 as well as the floating ballast 20 (and of course also the floating ballast guide 22). If the upper carriage 14 rotates 360° around the undercarriage 12, the tipping edges to be considered or the relative position of the center of gravity within the tipping edges also change regularly.

In addition, the stability of the boom system composed of main boom 15 and derrick boom 16 must also be considered. The load torque "wants" to move the main boom 15 forward in the direction of the load. This is prevented by the adjustable guy 33 which connects the main boom 15 to the derrick boom 16. The derrick boom 16 is held on the one hand by the floating ballast 20 via the first guy 31 and on the other hand by the guy block 17 via the second guy 32, which determines the lever arm to the pivot point of the derrick boom 16.

In crane operation, as explained at the beginning, independent of the rotational position of the upper carriage 14, tilting of the entire crane 10 laterally out of the lulling plane of the boom system must also be taken into account, for example due to crosswinds.

Typically, a large mass of floating ballast 20 is required primarily for raising or lowering the boom system, while a smaller floating ballast 20 is often sufficient for the actual load lifts. Therefore, if there is no load on the main boom 15, the weight of the full floating ballast 20 is usually so high that there is a risk of the crane 10 tipping backwards. Therefore, in such a situation, i.e. when setting down or mounting the load, counterweight plates must be removed from the floating ballast 20 or no steep jib positions can be approached with given ballasting.

In principle, it is possible to provide a two-part floating ballast 20 with a floating ballast frame on which, for example, two lateral stacks of counterweight plates can be arranged (first floating ballast part), and a second floating ballast part that can be detachably connected to the first floating ballast part, which are connected and act with the full mass for heavy strokes or for raising the booms. For actual crane operation and "normal" load lifts, the lighter second floating ballast part can be detached from the first floating ballast part. This is advantageous for the work flow on the construction site. However, such a solution does not result in a reduction of the counterweight plates to be transported to the construction site, because even if the ballast weights of the first floating ballast part are only necessary for erecting the main boom 15, they still have to be transported to the construction site.

The largest counterweight torque is therefore required to raise the booms 15 (if necessary, with luffing jib). In order to reduce the mass of the upper carriage ballast 50 and the floating ballast 20, their distance from the axis of rotation of the upper carriage would therefore have to be increased, which would, however, entail the disadvantages mentioned at the beginning.

According to the disclosure, the floating ballast guide 22 is therefore connected to the upper carriage rear 13 via one or more force transmission members 40. In the embodiment example shown here, two force transmission members 40 in the form of hydraulic cylinders are arranged at the same distance from the luffing plane extending centrally through the axis of rotation of the upper carriage. A support device 42 is attached to the upper carriage rear end 13 and projects radially rearwardly therefrom. The force transmission members 40 are connected in an articulated manner both to the support device 42 and to the floating ballast guide 22, in the embodiment example shown here to the first lattice part 24 of the floating ballast guide 22. The articulation points of the force transmission members 40 are located at the rear end of the support device 42 and, moreover, below the articulation point 21 of the floating ballast guide 22 (cf. FIG. 2).

Alternatively, only a single force transmission member 40 could be provided, which in this case is arranged in particular within the luffing plane. Furthermore, more than two force transmission members 40 could also be provided.

By means of the force transmission member 40, i.e. in the embodiment example shown here by corresponding pressurization of the hydraulic cylinders 40, a defined unloading force $F_1$ can be generated, which acts against the weight force $F_g$ of the floating ballast 20 and unloads the floating ballast guide 22 and, in particular, the ballast guy 31. The corresponding counterforce $F_2$ (reaction force to the unloading force $F_1$) acts in the other direction, i.e. in the direction of the support device 42, and thus loads the upper carriage 14. This counterforce $F_2$ can be used as a substitute for the entire upper carriage ballast 50 or at least part of it.

Figure 2:
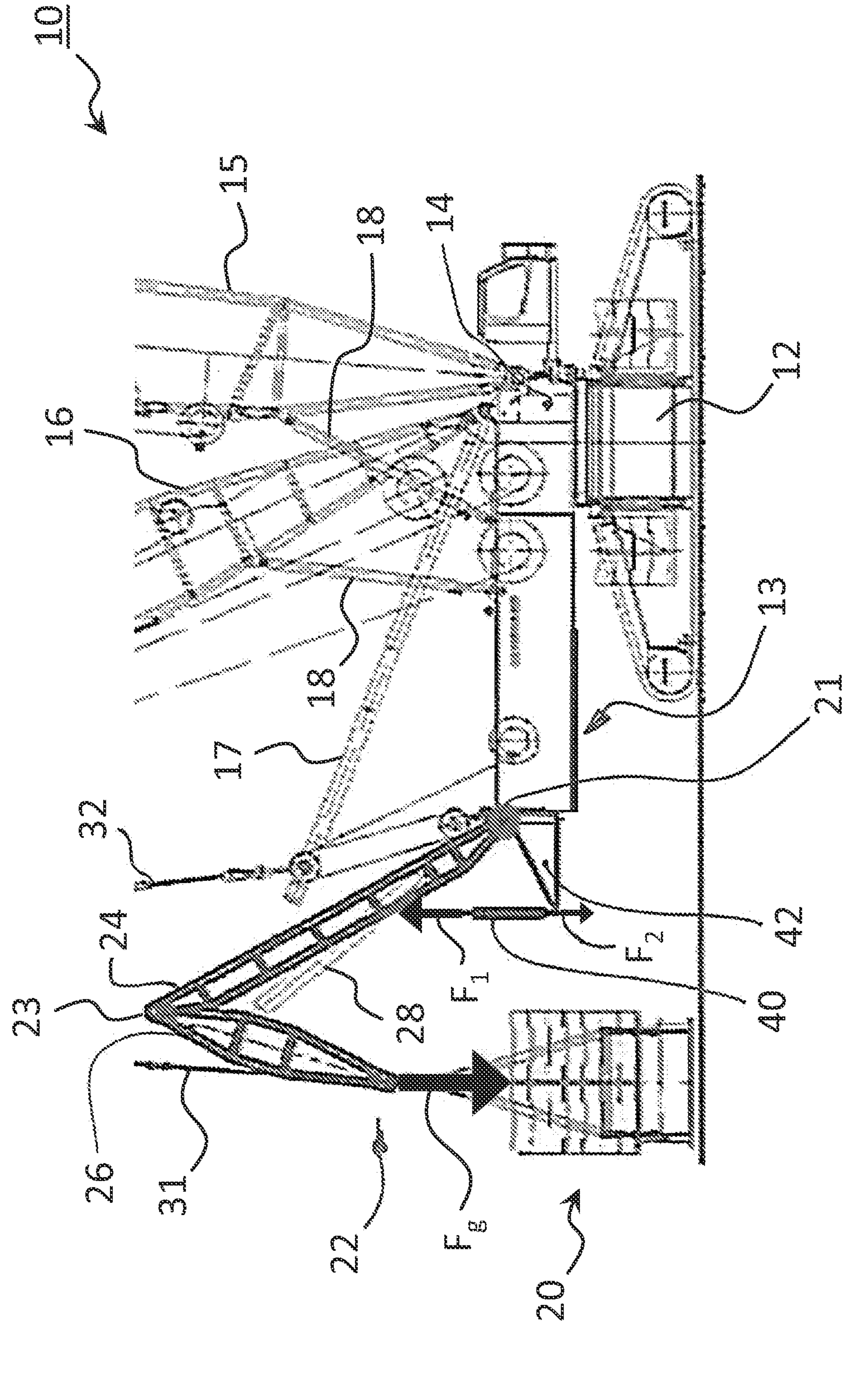
FIG. 2: a section of a second embodiment of the crane according to the disclosure in a side view.

FIG. 2 shows a second embodiment of the crane 10 according to the disclosure in a lateral section in the area of the upper carriage 14 and the floating ballast 20, whereby in comparison to the first embodiment no upper carriage ballast 50 is attached to the upper carriage 14. FIG. 2 also shows the forces $F_g$, $F_1$ and $F_2$ referred to.

According to the disclosure, the upper carriage ballast 50 is thus no longer, or at least no longer completely, formed by corresponding counterweight plates, but is specifically replaced or supplemented by force transmission member 40. As a result, the saved counterweight plates of the former upper carriage ballast 50 can now be stacked on the floating ballast 20, for example on the first floating ballast part mentioned above, and increase the height of the corresponding counterweight stacks. Sufficient installation space is available here. Due to the now increased lever arm (distance to the pivot axis of the upper carriage), fewer counterweight plates are now required to generate the same counter-torque. The counterweight plates that are thus not required do not have to be transported to the construction site, thus saving $CO_2$.

The force transmission member 40 in combination with the support device 42 further serve to stabilize the crane 10 laterally by introducing corresponding downwardly acting counterforces $F_2$ into the upper carriage 14 laterally of the luffing plane. In this way, the crane 10 can be effectively protected against lateral tilting.

Preferably, the hydraulic cylinders 40 are not hydraulically connected to each other and are, in particular, force-controlled. In this way, each cylinder 40 independently directs its force into the rear of the upper carriage 13.

Preferably, the hydraulic cylinders 40 are controlled/regulated by a corresponding control/regulation of an underlying hydraulic circuit for supplying the hydraulic cylinders 40. Here, the crane control 60 may preferably control a hydraulic source such as one or more hydraulic pumps and/or control valves to provide a desired unloading force or counterforce $F_1$, $F_2$ in order to generate the desired hydraulic pressure in the one or more hydraulic cylinders 40.

The unloading force $F_1$ and the counterforce $F_2$ (or their vertically acting force components) are preferably proportionally small compared to the weight force $F_g$ of the entire floating ballast. Thus, all involved/unloaded components continue to be loaded at similar levels and in the same direction when the floating ballast radius is large. The floating ballast guide 22 also does not change its direction of rotation about the horizontal luffing axis 21.

In general, it is possible to apply a constant or a controllable force from the swivel ballast guide 22 to the upper carriage 14 via the force transmission member 40. In the case of the hydraulic cylinders 40 described here, the applied force $F_2$ can preferably be controlled and continuously adjusted during operation. The regulation is preferably carried out via the crane control of the crane 10, which is only schematically designated with the reference numeral 60 in FIG. 1 (the actual position of the crane control 60 is of course not limited to the position shown).

In the preferred case that the magnitude of the counterforce $F_2$ can be set and, in particular, controlled, it can be used as a parameter variable for a load torque limitation of the crane 10. In this way, the crane 10 can be used more variably and with increased load capacity.

Using the solution according to the disclosure, the upper carriage ballast 50 can be selected to be substantially smaller or, at best, can be omitted altogether and replaced with a constant or variable force from the force transmission member or means 40.

As an alternative to a configuration as a hydraulic cylinder, the at least one force transmission member 40 can also be designed as a spring support. In this case, it can apply a constant force $F_2$ or a variable force F controlled by the crane control system 60 to the rear of the upper carriage 13.

As described above, assistance systems can be used in generic cranes, e.g. for use in the erection of wind turbines. In an advantageous embodiment of the inventive solution, an assistance system could control the at least one force transmission member 40 and selectively take a certain force component $F_1$ out of the boom system and simultaneously introduce it as force component $F_2$ into the upper carriage 14. In this way, the boom system can be brought back into equilibrium, for example, after a load has been deposited on the structure.

Furthermore, due to the cantilevered support device 42, the force $F_2$ introduced into the upper carriage rear 13 acts on the upper carriage 14 with a larger lever arm, thus acting more favorably than when an upper carriage ballast 50 rigidly mounted on the upper carriage 14 is used.

Consequently, the solution according to the disclosure is able to generate variable ballast states as a substitute for the upper carriage ballast 50. For this purpose, a suitable control or regulation with load torque limitation can be provided in the crane control 60. The possibility of continuing to use the hover ballast guide 22 creates additional variable conditions during crane operation. Thus, a divisible floating ballast 20 can still be used. Also, the floating ballast radius is adjustable in a wide range. In this way, the maximum ballast or counter-torque can be provided on the crane 10 for high load torques during operation with load or during assembly.

In one possible field of application, even the steepest boom positions can be approached. Such conditions can occur as an operating position after the load has been set down in the steep position of the main boom 15. In this position, the following settings are supported:

1. Minimum free-hanging conditions of the floating ballast 20 with respect to the mass of the ballast and its radius for maximum possible freedom of movement (turning, driving). This is to express: The ratio of the mass of the floating ballast 20 and its swing-out length is optimized. The further the floating ballast 20 is swung out, the more space the crane 10 requires (when turning and moving) on the construction site. The more floating ballast 20 is required, the more counterweight plates need to be transported to the construction site. Further, it is necessary that the floating ballast 20 is frequently lifted off the ground so that the crane 10 can freely rotate and travel.

2. High support force (force components $F_1$, $F_2$) on the unloading force transmission member 40 between the floating ballast guide 22 and the upper carriage rear 13.

The figures are drawn to scale, although other relative dimensions may be used. FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example

LIST OF REFERENCE NUMERALS

10 crane
12 undercarriage
13 rear end, rear end of upper carriage
14 upper carriage
15 main boom
16 derrick boom
17 guy block
18 support cylinder
20 floating ballast
21 luffing axis
22 floating ballast guide
23 pivot joint
24 first lattice part
26 second lattice part
28 drive (hydraulic cylinder)
31 first guy
32 second guy
33 length-adjustable guy
40 force transmission member
42 support device
50 upper carriage ballast
60 crane control
311 floating ballast hoist cylinder
$F_g$ weight force of the floating ballast
$F_1$ unloading force
$F_2$ counter force

The invention claimed is:

1. Crane, having an upper carriage rotatable about a vertical axis of rotation and a floating ballast connected to the upper carriage via a floating ballast guide, wherein the floating ballast guide comprises a drive for changing the floating ballast radius,
wherein
in that the floating ballast guide is connected to the upper carriage via at least one force transmission member which is configured to partially unload the floating ballast guide by an unloading force counteracting the weight force of the floating ballast and thereby to introduce a corresponding counterforce into the upper carriage.

2. Crane according to claim 1, wherein the force transmission member is connected to a support device which is mounted to the rear of the upper carriage and protrudes rearwardly from the upper carriage.

3. Crane according to claim 2, wherein at least two force transmission member are provided, which are arranged laterally and, symmetrically with respect to a luffing plane extending through the axis of rotation of the upper carriage.

4. Crane according to claim 3, wherein the floating ballast guide comprises two lattice parts pivotally connected to each other via a pivot joint, wherein a first lattice part is connected to the rear of the upper carriage in a manner pivotable about a horizontal pivot axis, wherein the drive comprises a hydraulic cylinder pivotally connected to at least one of the lattice parts.

5. Crane according to claim 4, wherein the force transmission member is pivotally coupled to one of the lattice parts to the first lattice part.

6. Crane according to claim 5, wherein the unloading force or counterforce generated by the force transmission member can be made available to a load torque limitation of the crane and is variable controllable, by the load torque limitation.

7. Crane according to claim 6, wherein at least two force transmission members are controllable or adjustable independently of each other.

8. Crane according to claim 4, wherein the force introduced by the force transmission member into one of the lattice parts causes an unloading torque about the luffing axis that is smaller than the torque produced about the luffing axis as a result of the weight force.

9. Crane according to claim 1, wherein the magnitude of the unloading force which can be applied by means of the force transmission member is constant or variable controllable.

10. Crane according to claim 1, wherein the force transmission member is permanently connected to the floating ballast guide and the upper carriage.

11. Crane according to claim 1, wherein the force transmission member comprises a spring member.

12. Crane according to claim 1, wherein the force transmission member for actively generating the unloading force can be actuated hydraulically and comprises a hydraulic cylinder, wherein the force transmission member can be actuated or controlled by means of a crane control in such a way that a predetermined unloading force or counterforce is established.

13. Crane according to claim 1, further comprising a derrick boom hinged to the upper carriage and connected to the floating ballast via a first guy and to the upper carriage via a second guy via a guy block.

14. Crane according to claim 1, wherein the upper carriage comprises, in addition to the floating ballast, an upper carriage ballast immovable relative to the upper carriage and having stackable counterweight elements, wherein the counterweight elements are selectively stackable on the floating ballast.

* * * * *